United States Patent Office 2,831,891
Patented Apr. 22, 1958

2,831,891
2-HEXYL-2 HYDROXYTRIDECANEDIOIC ACID

Thomas R. Steadman, Waban, and John O. H. Peterson, Jr., Burlington, Mass., assignors to National Research Corporation, Cambridge, Mass., a corporation of Massachusetts No Drawing. Application December 17, 1956
Serial No. 628,484

1 Claim. (Cl. 260—535)

This invention relates to the production of chemicals and in particular to the production of a novel dibasic acid.

A principal object of the present invention is to prepare the new chemical compound 2-hexyl-2-hydroxytridecanedioic acid.

Other objects of the invention will in part be obvious and will in part appear hereinafter.

The invention accordingly comprises the new chemical compound possessing the features and properties and the process involving the several steps and the order of one or more of such steps with respect to each of the others which are exemplified in the following detailed disclosure, and the scope of the application of which will be indicated in the claims.

For a fuller understanding of the nature and objects of the invention, reference should be had to the following detailed disclosure.

The present invention is directed to the new chemical compound, 2-hexyl-2-hydroxytridecanedioic acid prepared by heating 12-carboxamido-12-hydroxystearic acid or an ester thereof with an alkali metal hydroxide. This compound has been found to be particularly useful in the production of polyesters for the manufacture of plastics and paint resins.

Several specific detailed methods of producing the above acid are set forth in the following non-limiting examples.

Example I

Fifty grams of 80 percent pure methyl 12-carboxamido-12-hydroxystearate (obtained in the manner illustrated in the copending application Serial No. 628,483 executed even date herewith) were mixed with 35 grams of sodium hydroxide, 71 grams of water and 71 grams of diethylene glycol. The mixture was heated and at 112° C. ammonia begin to be evolved. The heating was continued until no more ammonia was given off. The highest temperature reached was about 140° C. An amount of water was added during the heating equivalent to that being removed from the reaction mixture. Upon completion of the ammonia evolution, the reaction mixture was neutralized with hydrochloric acid. There resulted a solid white crystalline material amounting to 6.9 grams and 61 grams of an oil which, upon standing, solidified. The crystalline material and about 48 percent of the latter solid material was identified by its neutralization equivalent and elemental analysis as 2-hexyl-2-hydroxytridecanedioic acid.

Example II

A mixture of 236 grams of 78 percent pure methyl 12-carboxyamido-12-hydroxystearate, 41 grams of sodium hydroxide and 332 grams of water were heated to between 125° and 130° C. with stirring in an autoclave for six hours. Upon completion of the reaction, the reaction mixture was acidified to pH 3 with a 20 percent aqueous solution of hydrochloric acid with the formation of a precipitate of crude dibasic acid. The material was washed free of hydrochloric acid and recrystallized from one liter of toluene. The purified dibasic acid (124.3 grams) identified as 2-hexyl-2-hydroxytridecanedioic acid had a neutralization equivalent of 174.5 g./e. (theoretical value=172 g./e.) and melted at 108–108.5° C.

The above reactions can be represented by the following equation:

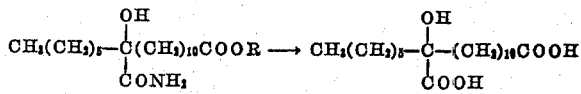

where R may be a hydrogen, methyl, ethyl or like group.

The 2-hexyl-2-hydroxytridecanedioic acid can be prepared by heating either 12-carboxamido-12-hydroxystearic acid (also designated as 12-carboxamido-12-hydroxyoctadecanoic acid) or an ester thereof such as the methyl ester illustrated in the examples with an alkali metal hydroxide. In addition to the use of sodium hydroxide, aqueous solutions of potassium hydroxide are also applicable. Aqueous solutions with an alkali metal hydroxide concentration of between about 5 percent and 50 percent by weight are quite suitable.

The reaction between the amide-acid or amide-ester and alkali metal hydroxide must be carried out at a temperature above 100° C., since at temperatures below 100° C. no appreciable reaction or ammonia evolution is noticed. The reaction mixture is maintained at this elevated temperature until the evolution of ammonia therefrom has ceased.

Upon completion of the reaction, the dibasic acid is present as the alkali metal salt, e. g., sodium 2-hexyl-2-hydroxytridecanedioate. The free acid can be recovered from its salt by treatment with a suitable mineral acid such as hydrochloric acid, nitric acid, phosphoric acid, sulfuric acid and the like.

Since certain changes may be made in the above chemical compound and process without departing from the scope of the invention herein involved, it is intended that all matter contained in the above description shall be interpreted as illustrative and not in a limiting sense.

What is claimed is:

The chemical compound 2-hexyl-2-hydroxytridecanedioic acid.

No references cited.